(12) United States Patent
Cahill et al.

(10) Patent No.: US 7,099,890 B2
(45) Date of Patent: *Aug. 29, 2006

(54) STORING OBJECTS IN A SPREADSHEET

(75) Inventors: Jason Cahill, Carnation, WA (US); Jason Allen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/911,856

(22) Filed: Aug. 5, 2004

(65) Prior Publication Data

US 2005/0015714 A1      Jan. 20, 2005

Related U.S. Application Data

(63) Continuation of application No. 09/755,415, filed on Jan. 5, 2001, now Pat. No. 6,779,151.

(51) Int. Cl.
G06F 17/30 (2006.01)

(52) U.S. Cl. ...................................... 707/103; 715/503

(58) Field of Classification Search ................ 715/503; 707/102, 103 R
See application file for complete search history.

(56) References Cited

U.S. PATENT DOCUMENTS

| | | | | |
|---|---|---|---|---|
| 5,255,363 A | 10/1993 | Seyler | ........................ | 715/526 |
| 5,303,146 A | 4/1994 | Ammirato et al. | .......... | 715/503 |
| 5,317,686 A | 5/1994 | Salas et al. | .................. | 715/503 |
| 5,339,410 A | 8/1994 | Kanai | ......................... | 707/100 |
| 5,418,902 A | 5/1995 | West et al. | ................... | 715/503 |
| 5,485,617 A | 1/1996 | Stutz et al. | .................. | 719/315 |
| 5,603,021 A * | 2/1997 | Spencer et al. | ............. | 715/853 |
| 5,708,827 A | 1/1998 | Kaneko et al. | ............. | 715/503 |
| 5,721,847 A | 2/1998 | Johnson | ........................ | 345/786 |
| 5,784,545 A | 7/1998 | Anderson et al. | ........... | 707/507 |
| 5,883,623 A | 3/1999 | Cseri | ........................... | 345/866 |
| 5,893,123 A | 4/1999 | Tuinenga | ...................... | 707/504 |
| 5,983,268 A | 11/1999 | Freivald et al. | .............. | 709/218 |
| 6,034,681 A | 3/2000 | Miller et al. | .................. | 345/748 |
| 6,122,649 A | 9/2000 | Kanerva et al. | ............. | 715/516 |
| 6,157,934 A | 12/2000 | Khan et al. | .................. | 715/503 |
| 6,161,107 A | 12/2000 | Stern | ........................ | 707/104.1 |
| 6,182,279 B1 * | 1/2001 | Buxton | ........................ | 717/100 |
| 6,192,379 B1 | 2/2001 | Bekenn | ........................ | 715/503 |

(Continued)

OTHER PUBLICATIONS

K. Ewbank, VBA insider, Developer Network Journal, No. 18, May-Jun. 2000, pp. 34-38.

(Continued)

*Primary Examiner*—Leslie Wong
(74) *Attorney, Agent, or Firm*—Merchant & Gould, LLC

(57) ABSTRACT

A spreadsheet application provides a rich programming and modeling environment. The spreadsheet application of the present invention does this by recognizing a new "object" data type in addition to the conventional spreadsheet data types: numbers, text, date, Boolean, and error. The object data type can be used to create an instance of an external object and store the object in a cell of a spreadsheet. Once an object has been created in a spreadsheet, the object can be invoked or accessed from any other cell or formula in the spreadsheet. The spreadsheet application of the present invention provides several special object functions that operate to enable a user to create and invoke an object. A user can directly call functions from objects that are installed on a local or remote machine, by integrating an object function within a spreadsheet formula. Thus, the user is provided with a tool for integrating outside data services into a spreadsheet and may take advantage of pre-existing objects.

19 Claims, 8 Drawing Sheets

U.S. PATENT DOCUMENTS

| | | | |
|---|---|---|---|
| 6,247,020 B1 | 6/2001 | Minard | 707/104.1 |
| 6,298,352 B1 | 10/2001 | Kannan et al. | 707/102 |
| 6,317,758 B1 * | 11/2001 | Madsen et al. | 715/504 |
| 6,341,288 B1 | 1/2002 | Yach et al. | 707/103 R |
| 6,366,934 B1 | 4/2002 | Cheng et al. | 707/513 |
| 6,401,099 B1 | 6/2002 | Koppolu et al. | 707/103 R |
| 6,427,153 B1 | 7/2002 | Nelson et al. | 707/103 R |
| 6,453,328 B1 | 9/2002 | Schaeffer et al. | 707/515 |
| 6,701,485 B1 * | 3/2004 | Igra et al. | 715/503 |
| 6,779,151 B1 * | 8/2004 | Cahill et al. | 715/503 |

OTHER PUBLICATIONS

P. Lacoude and G. Ketema, Programming Excel COM objects in C++, C/C++ Users Journal v18, n4, Apr. 2000, 22, 24-26, 28.

Harris, Matthew; "Sams teach yourself Microsoft Excel 2000 programming in 21 days", Indianapolis, Ind. Sams Publishing, 1999.

R. W. Djang and M.M. Burnett, "Similarity inheritance: a new model of inheritance for spreadsheet VPLs," IEEE Symposium on Visual Languages, 1998, pp. 134-141.

D. Paquette and K. Paquette, "Linking Framework spreadsheets," Ashton-Tate Quarterly, Oct.-Dec. 1988, pp. 59-64.

D.E. Brodersen, L.B. Jenner, G.R. Andersen, and J Nyborg, ZAct: a program for construction, automated setup and bookkeeping of crystallization experiments, J. Applied Crystallography, 1999, v32, 5 (Oct. 1) pp. 1012-1016.

M.C.ChuCarroll and L.L. Pollock, "Composite tree parallelism: language support for general purpose parallel programming," J. Programming Languages, 1997, v5, n1, pp. 1-36.

K. Ewbank, "VBA inside," Developer Network Journal, No. 18, May-Jun. 2000, pp. 34-38.

P. Lacoude and G. Ketema "Programming Excel COM objects in C++," C/C++ Users Journal, v 18, n4, Apr. 2000, pp. 22, 24-26, 28.

T.Systa, Yu Ping and H. Muller, "Analyzing Java software by combining metrics and program visualization," Proceedings of the Fourth European Conference on Software Maintenance and Reengineering, 2000, pp. 199-208.

* cited by examiner

|   | A | B | C | D |
|---|---|---|---|---|
| 1 | =CREATEOBJECT("marketdata", "\investor") |  |  |  |
| 2 |  | MSFT | =OBJECT(A1).LastPrice(B1) |  |
| 3 |  | INTC | =OBJECT(A1).LastPrice(B2) |  |
| 4 |  | YHOO | =OBJECT(A1).LastPrice(B3) |  |
| 5 |  | CSCO | =OBJECT(A1).LastPrice(B4) |  |
| 6 |  | EBAY | =OBJECT(A1).LastPrice(B5) |  |

STORING OBJECTS IN A SPREADSHEET

This application is a continuation of application Ser. No. 09/755,415, entitled "Storing Objects In A Spreadsheet," filed Jan. 5, 2001, now issued as U.S. Pat. No. 6,779,151, which is incorporated herein by reference.

FIELD OF THE INVENTION

The present invention generally relates to electronic spreadsheets. More particularly, the present invention relates to storing automation objects within the cells of a spreadsheet.

BACKGROUND OF THE INVENTION

Spreadsheet application users are utilizing spreadsheets in more and more sophisticated ways. While spreadsheets were once primarily used to facilitate financial and technical calculations and analyses, users are demanding the ability to create and invoke user-defined functions within spreadsheets. Often, spreadsheet applications are used to create functioning spreadsheet objects that can be accessed over the Internet.

On a basic level, a spreadsheet is ultimately a programming tool. The cells of a spreadsheet can be used to store both data and formulas for manipulating data. However, unlike more sophisticated programming environments such as BASIC, C++, and Pascal, conventional spreadsheets provide no means to implement functional components (automation objects) residing outside of the spreadsheet. With the ever-expanding popularity of object-oriented programming models, valuable programming tools have been made available in the form of discrete, stand-alone automation objects. With the advent of component management systems, such as the Component Object Model, marketed by Microsoft Corporation of Redmond, Wash., such objects are generally readily accessible to other objects through the component management system.

Unfortunately, conventional spreadsheet applications have not provided access to external objects. As a result, conventional spreadsheets have served a limited role as a programming tool, as compared to the more sophisticated programming environments mentioned above. Therefore, there is a need in the art for a spreadsheet component that can be used to create a spreadsheet object that can access external objects through a component management system. The spreadsheet object should be able to process formulas that invoke external objects and store objects in the cells of the spreadsheet object. The spreadsheet object also should process formulas invoking the external object after the object has been stored in a spreadsheet cell and should recognize an object as a new data type.

SUMMARY OF THE INVENTION

The present invention is a spreadsheet component that provides a rich programming and modeling environment. The spreadsheet component of the present invention does this by recognizing a new "object" data type in addition to the conventional spreadsheet data types: numbers, text, date, Boolean, and error. The object data type enables a spreadsheet object to have an embedded instance of an external object that exists outside of the spreadsheet component. Once an object has been created within a spreadsheet object, the object can be invoked from any other cell or formula in the spreadsheet object.

The spreadsheet component of the present invention provides several special object functions that operate to enable a user to create and invoke an object. A user can directly call functions from objects that are installed on a local or remote machine, by integrating an object function within a spreadsheet formula. Thus, the user is provided with a tool for integrating outside data services and functionality into a spreadsheet object. Moreover, the user may take advantage of pre-existing external objects.

The spreadsheet component makes available a new class of object functions. This new class of object functions may be integrated into formulas (as can most spreadsheet function). The spreadsheet component also recognizes the "." operator that is the conventional means (in object models) for separating object names and properties. This operator enables reference to specific object properties within the external object. Advantageously, the spreadsheet component of the present invention provides a sophisticated programming environment wherein a spreadsheet object can be enhanced with the ability to invoke the functionality of external objects through a component management system.

In one aspect of the present invention a method is provided for embedding an external object in a spreadsheet cell of a spreadsheet object. The method receives an object function and an external object identifier as input. The method parses the object function to determine whether the object function is valid and has a proper syntax. The method also accesses the external object identified by the external object identifier, to determine whether the external object is functional. If the object function is valid and has a proper syntax, then the method stores an embedded object in the spreadsheet cell. If the external object is functional, then the method recalculates the spreadsheet cell.

In another aspect of the present invention, a spreadsheet component is provided having an object function for invoking an external object. The spreadsheet component has a formula parser component and a recalculation component. The parser component functions to compare the object function to a function library to determine whether the object function conforms to a predefined syntax contained in a library entry associated with the object function. The parser component also functions to determine whether the object function properly identifies the external object. If the parser component determines that the object function conforms to the predefined syntax and properly identifies the external object, then the recalculation component functions to invoke the external object identified by the object function.

The various aspects of the present invention may be more clearly understood and appreciated from a review of the following detailed description of the disclosed embodiments and by reference to the drawings and claims.

BRIEF DESCRIPTION OF THE DRAWINGS

FIG. 4 is a block diagram depicting an exemplary spreadsheet object having an embedded object and object functions invoking the object.

DETAILED DESCRIPTION OF EXEMPLARY EMBODIMENTS

The present invention is a spreadsheet application program (spreadsheet component) that provides a rich programming and modeling environment. The spreadsheet component of the present invention does this by recognizing a new "object" data type in addition to the conventional data types: numbers, text, date, Boolean, and error. The object data type enables a spreadsheet object to have an embedded instance of an external object that exists outside of the spreadsheet component. Once an object has been created within a spreadsheet object, the object can be invoked from any other cell or formula in the spreadsheet object.

The spreadsheet component of the present invention provides several special object functions that operate to enable a user to create and invoke an object. A user can directly call functions from objects that are installed on a local or remote machine, by integrating an object function within a spreadsheet formula. Thus, the user is provided with a tool for integrating outside data services and functionality into a spreadsheet object. Moreover, the user may take advantage of pre-existing external objects.

The spreadsheet component makes available a new class of object functions. This new class of object functions may be integrated into formulas (as can most spreadsheet function). The spreadsheet component also recognizes the "." operator that is the conventional means used by object models to separate object names and object properties. This operator enables reference to specific object properties within the external object. Advantageously, the spreadsheet component of the present invention provides a sophisticated programming environment wherein a spreadsheet object can be enhanced with the ability to invoke the functionality of external objects through a component management system.

Figure 1:
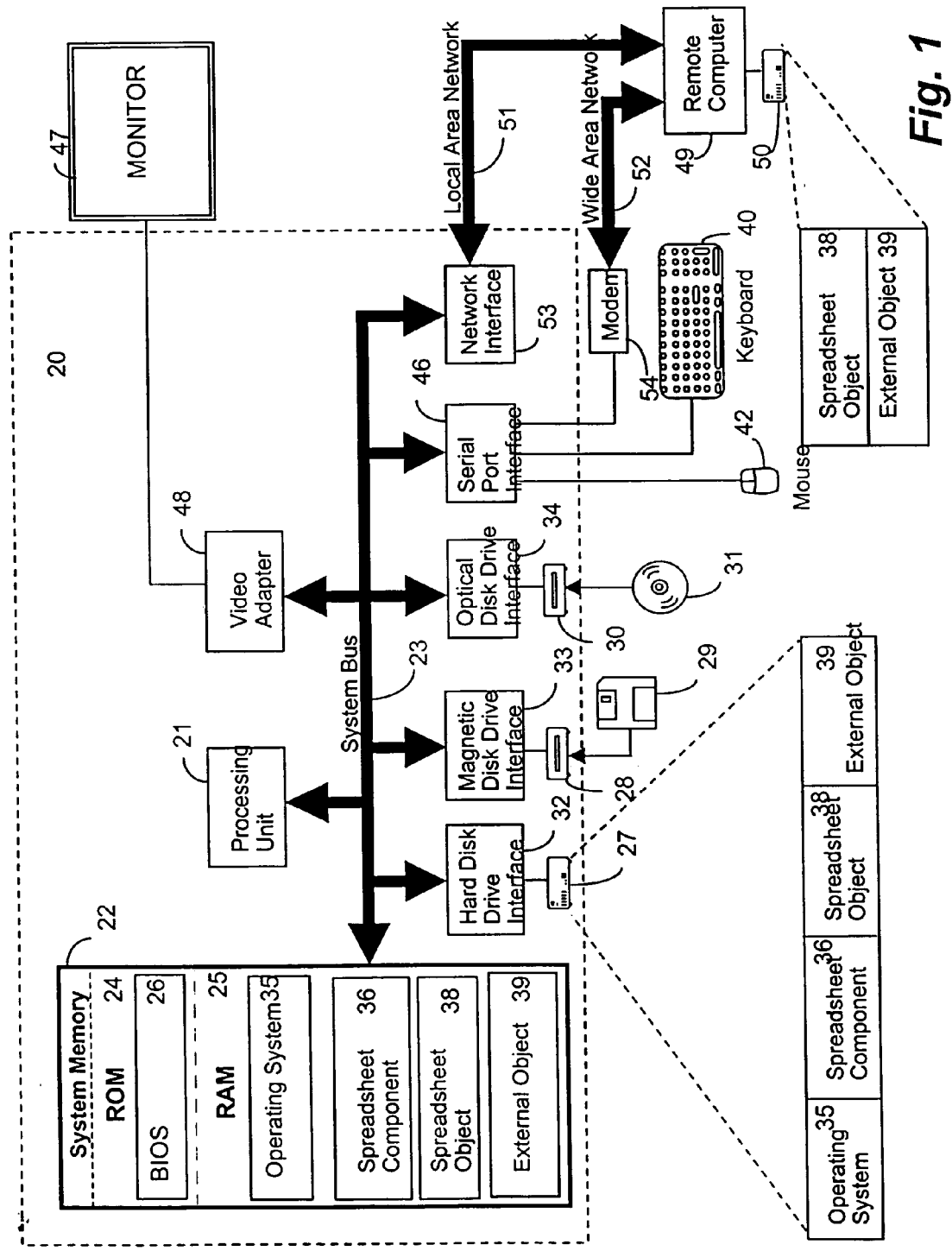
FIG. 1 is a block diagram illustrating an exemplary operating environment for implementing of the present invention.

Exemplary embodiments of the present invention will hereinafter be described with reference to the drawing, in which like numerals represent like elements throughout the several figures. FIG. 1 illustrates an exemplary operating environment for implementation of the present invention. The exemplary operating environment includes a general-purpose computing device in the form of a conventional personal computer 20. Generally, a personal computer 20 includes a processing unit 21, a system memory 22, and a system bus 23 that couples various system components including the system memory 22 to processing unit 21. System bus 23 may be any of several types of bus structures including a memory bus or memory controller, a peripheral bus, and a local bus using any of a variety of bus architectures. The system memory includes a read only memory (ROM) 24 and random access memory (RAM) 25. A basic input/output system (BIOS) 26, containing the basic routines that help to transfer information between elements within personal computer 20, such as during start-up, is stored in ROM 24.

Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. Although the exemplary environment described herein employs hard disk 27, removable magnetic disk 29, and removable optical disk 31, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 20. For example, one or more data files 60 may be stored in the RAM 25 and/or hard drive 27 of the personal computer 20.

A number of program modules may be stored on hard disk 27, magnetic disk 29, optical disk 31, ROM 24, or RAM 25, including an operating system 35, a spreadsheet component 36, a spreadsheet object 38, and an external object 39. Program modules include routines, sub-routines, programs, objects, components, data structures, etc., which perform particular tasks or implement particular abstract data types. Aspects of the present invention may be implemented in the context of a spreadsheet object 38 that can be created or modified by a spreadsheet component 36. The spreadsheet component 36 generally comprises computer-executable instructions for creating or modifying a spreadsheet object. The spreadsheet object 38 generally comprises computer-executable instructions constituting a spreadsheet modeling environment (i.e., a spreadsheet) that can access and invoke an external object 39. The external object 39 is typically maintained within the context of a component management system (not shown), which is generally functions to provide a structure for brokering between objects that are designed to communicate with one another.

A user may enter commands and information into personal computer 20 through input devices, such as a keyboard 40 and a pointing device 42. Other input devices (not shown) may include a microphone, joystick, game pad, satellite dish, scanner, or the like. These and other input devices are often connected to processing unit 22 through a serial port interface 46 that is coupled to the system bus 23, but may be connected by other interfaces, such as a parallel port, game port, a universal serial bus (USB), or the like. A display device 47 may also be connected to system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers 49. Remote computer 49 may be another personal computer, a server, a client, a router, a network PC, a peer device, or other common network node. While a remote computer 49 typically includes many or all of the elements described above relative to the personal computer 20, only a memory storage device 50 has been illustrated in the figure. The logical connections depicted in the figure include a local area network (LAN) 51 and a wide area network (WAN) 52. Such networking environments are commonplace in offices, enterprise-wide computer networks, intranets, and the Internet.

When used in a LAN networking environment, the personal computer 20 is often connected to the local area network 51 through a network interface or adapter 53. When used in a WAN networking environment, the personal computer 20 typically includes a modem 54 or other means for establishing communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device 50. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
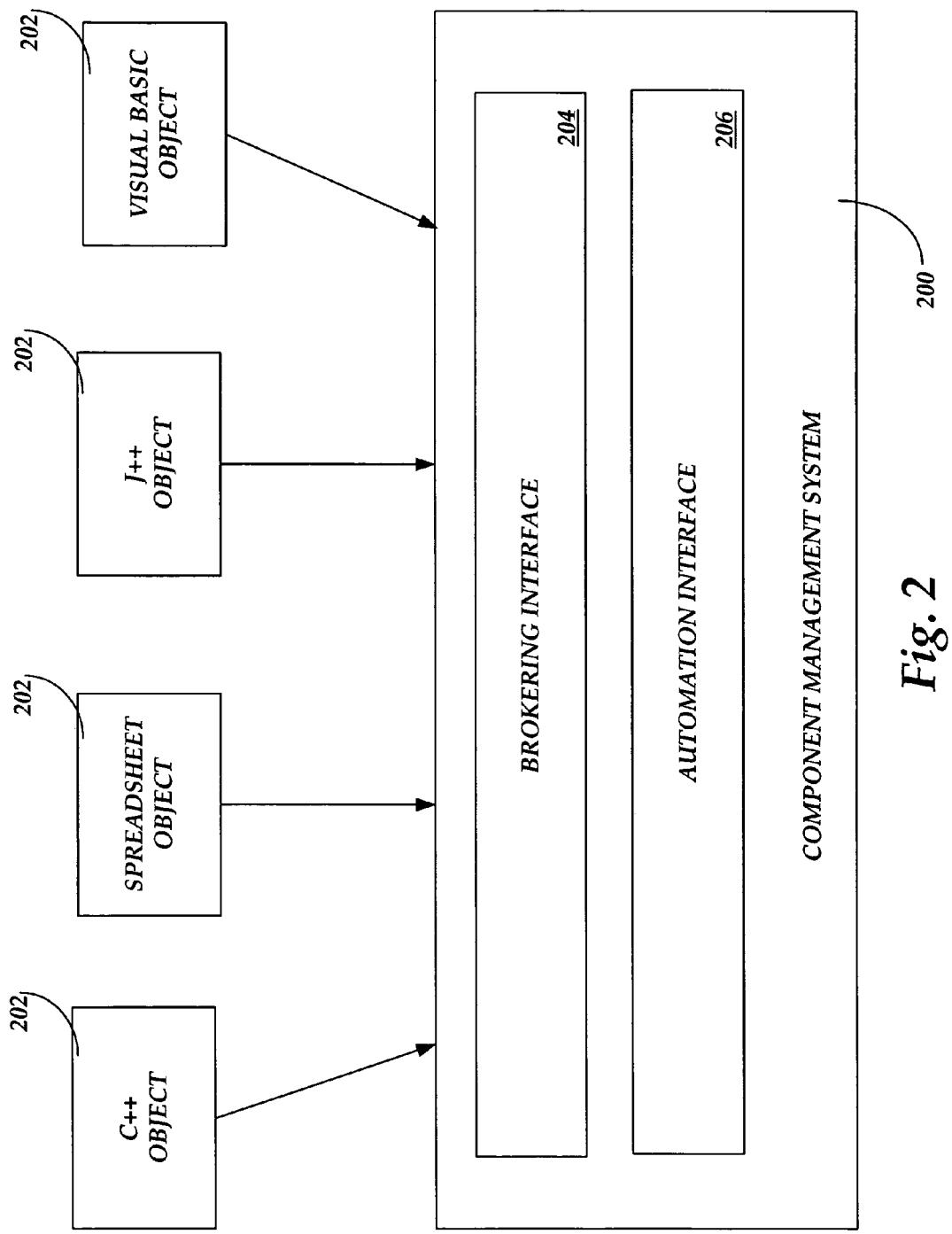
FIG. 2 is a block diagram illustrating some of the primary components of an exemplary embodiment of the present invention, in the context of an exemplary component management system.

FIG. 2 depicts an exemplary component management system 200. The component management system (CMS) 200 provides a means for brokering between objects 202 that are designed to communicate with one another. The objects 202 can be written in various programming environments, such as C++, and Java. At a basic level, a component management system simply provides an agreed upon brokering interface 204 through which the objects 202 can communicate by adhering to a predetermined communications protocol. Microsoft's Component Object Model provides a brokering interface, "IInterface", that performs this function. In addition to the basic brokering interface 204 provided by the component management system 200, a second layer of interface can be implemented between the objects 202 and the component management system 200. An automation interface 206 can be used to enable the objects 202 to investigate the capabilities of another object. That is, an object can communicate with another object through the automation interface 206 to determine the other object's functionality and/or capabilities. Once this information has been gathered from the other object, the investigating object can invoke the other object.

In an exemplary embodiment of the present invention, an object can be embedded (stored) in a cell of a spreadsheet component. Once the object has been embedded in the spreadsheet, a spreadsheet user can write formulas against the object, thereby invoking the object. This embedding is made possible by the expansion of the spreadsheet component's data types to include an "object" data type.

Figure 3:
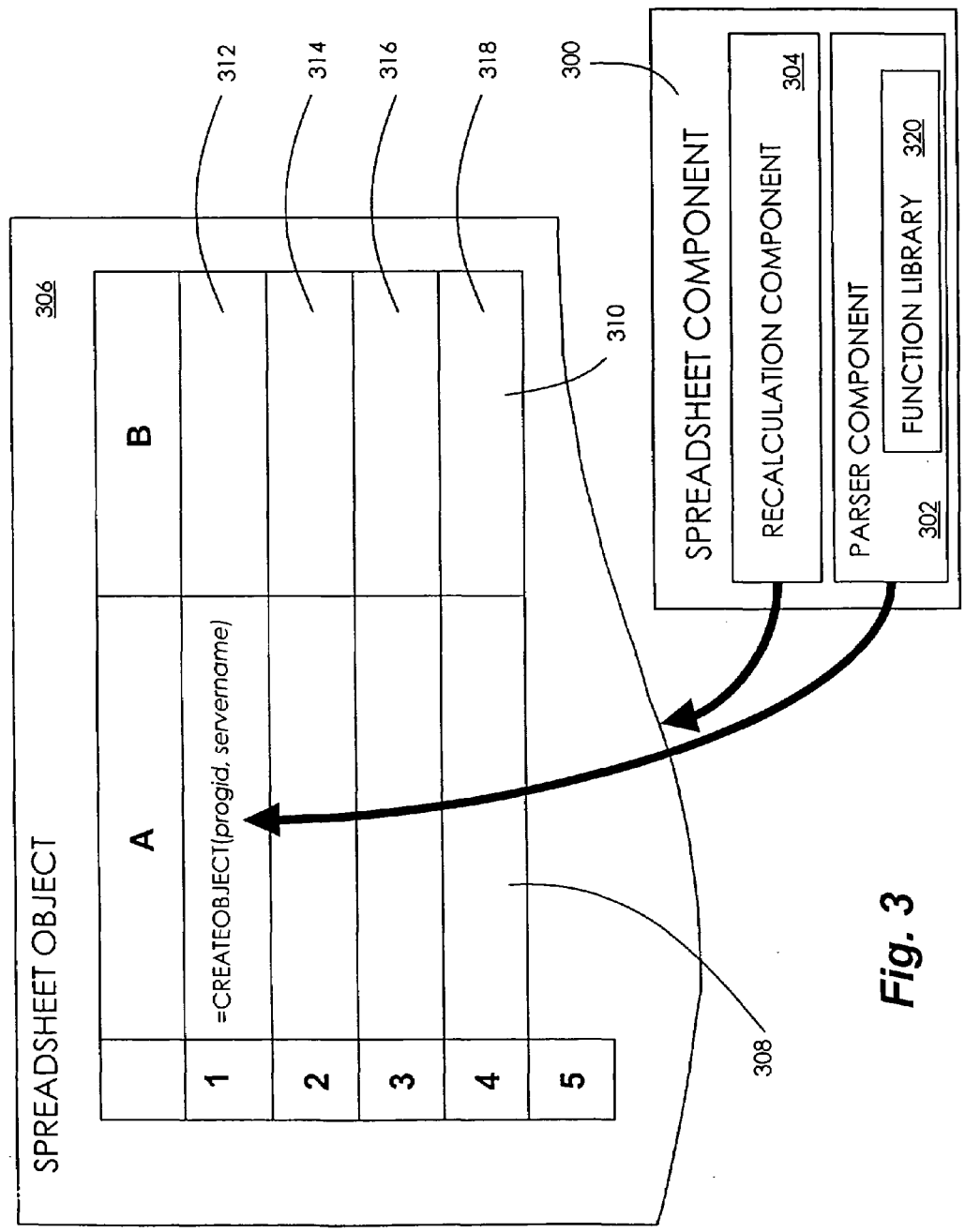
FIG. 3 is a block diagram depicting a spreadsheet object and a spreadsheet component that is an exemplary embodiment of the present invention.

FIG. 3 depicts an exemplary spreadsheet component 300 and a conventional spreadsheet object 306. The spreadsheet component 300 may be similar to a conventional desktop-based spreadsheet application program, such as Microsoft Excel, marketed by Microsoft Corporation of Redmond, Wash. Alternatively, the spreadsheet component 300 may be more of a development tool, such as Microsoft Spreadsheet Web Component, marketed by Microsoft Corporation of Redmond, Wash. The Spreadsheet Web Component provides a means for creating components to enable spreadsheet-like functionality in other applications, such as a web browser. Typically, in the context of a web browser, the spreadsheet web component can be used to embed a spreadsheet object in a web page. Those skilled in the art will appreciate that the present invention can be implemented in various kinds of spreadsheets, regardless of the exact context. For the purposes of this disclosure, the term spreadsheet component is used to mean both desktop-type spreadsheet application programs and spreadsheet development tools.

Similarly, the spreadsheet object 306 can be a stand-alone spreadsheet document created by a desktop spreadsheet application program or can be a spreadsheet object that is embedded within another document (e.g., a web page). In either case, the spreadsheet object contains cells that are broken into columns and rows. The spreadsheet object 306 of FIG. 3 has been broken into columns 308 and 310 and rows 312–318. For simplicity, a cell in a spreadsheet object is conventionally referred to by its column and row name, this convention will be used in this disclosure.

As depicted in FIG. 3, a formula has been stored in cell A1. When any formula is stored in any cell in the spreadsheet object 306, the spreadsheet component 300 must interpret the contents of the cell. The spreadsheet component 300 can include a parser component 302 and a recalculation component 304. The parser component 302 examines the contents of each cell in the spreadsheet object 306. The parser component 302 examines every aspect of the formula (or data) to verify its syntax. The parser component 302 includes a function library 320 and compares each function in each formula of the spreadsheet object 306 to the function library 320 to verify the function's syntax. The parser component compares the CREATEOBJECT function to the function library to determine whether the function is a valid spreadsheet function. In addition, the function library includes a template for each function that allows the parser component 302 to determine whether the proper syntax has been used.

The parser component also must determine the data type of a particular cell. Thus, the parser component 302 of an exemplary embodiment of the present invention may recognize data types in addition to those recognized by the conventional parser component. Specifically, the parser component 302 should recognize an embedded object as a data type.

After the parser component has recognized the data type and syntax of a cell, the recalculation component 304 of a spreadsheet component 300 must then refresh the spreadsheet object 306 by recalculating the values stored in the cells of the spreadsheet object. While the recalculation component 304 and the parser component 302 are components that are commonly found in conventional spreadsheets, the recalculation component and the parser component of an exemplary embodiment of the present invention have been configured to enable communication between the spreadsheet object 306 and other objects 202, via the component management system 200.

Referring again to FIG. 3, spreadsheet cell A1 contains the object formula "=CREATEOBJECT (progid, servername)". The CREATEOBJECT function can be used to embed an object in the spreadsheet object 306. The parser component 302 of an exemplary embodiment of the present invention is configured to read the CREATEOBJECT function. In the embodiment of the CREATEOBJECT function used in the formula stored in cell A1 of the spreadsheet object 306, two arguments are used to identify the location of the external object of which the embedded object will be an instance. Of course, other arguments could be used to identify an external object to embed an object in a spreadsheet object.

The recalculation component 304 must also be configured to recognize the function that has been read by the parser component 302 and to perform calculations based on the parsed formula. When a user enters the CREATEOBJECT formula depicted in cell A1 of FIG. 3, the recalculation component 304 will find the external object whose name and location are identified by the "progid" and "servername" arguments and will inquire as to the external object's type. The object's type can be identified through the automation interface 206 discussed above in connection with FIG. 2. Once the object's type has been determined, the recalculation component 304 can display a string in cell A1 to identify the object. Typically, the string takes the following form: [Object Objectname]. Thus, the formula entered by a user can be represented in the spreadsheet in a more user-friendly way that provides the user with some feedback as to the identification of the object.

In an alternative embodiment, the recalculation component can inquire as to whether the external object includes information as to how the object can be displayed in the spreadsheet object 306. For example, the external object may include code to create a graphical representation of the object in cell A1. Alternatively, the object could include a representation property with a reference or pointer to an image file that can be embedded into cell A1 to graphically represent the object.

The recalculation component 304 is responsible for causing the spreadsheet object 306 to recalculate the values of its cells. The recalculation component 304 is normally configured to trigger a recalculation anytime that a cell within a spreadsheet object 306 is changed. However, the embedding of objects within the spreadsheet object 306, requires the recalculation component 304 of an exemplary embodiment of the present invention to trigger recalculation in other circumstances as well.

The recalculation component 304 also must trigger a recalculation when the external object changes.

By using a standard notification interface, such as the IPropertyNotify interface used in Microsoft's Component Object Model, the component management system 200 can be used to notify the spreadsheet object 306 whenever the external object is changed. To do this, the recalculation component 304 must inform the external object through the notification interface that the spreadsheet object 306 desires to monitor the external object. If the external object is changed, then the notification interface will notify the spreadsheet object 306 of that change. When such a change has been identified, the recalculation component 304 can trigger a recalculation of the spreadsheet object 306. Thus, the spreadsheet object can maintain current information about the external object and modify the values of its cells accordingly.

FIG. 4 depicts an exemplary spreadsheet object 400 including columns A-D and rows 1–6. The CREATEOBJECT function has been stored in cell A1. In this example, the external object is identified by the object name "marketdata" and by object location "//investor". Thus, the create object function operates to embed the marketdata object in cell A1 of spreadsheet object 400.

A second object function "OBJECT" can also be added to the function library 320 of the parser component 302. The OBJECT function is a reference object function in that it can be used to refer to the object embedded in the spreadsheet object 400. In the example of FIG. 4, cell C1 contains the formula "=OBJECT(A1).LastPrice(B1)". Cell C1, thus, refers to the object embedded in cell A1. The syntax of the OBJECT function enables the OBJECT function to refer to a particular property of the object. In the example of cell C1, the OBJECT function refers to the "LastPrice" property of the object in A1. As described above, the object in cell A1 is the marketdata object. Thus, the LastPrice property of the marketdata object can be determined and stored in cell C1. The OBJECT function utilizes the period or dot operator (".") to indicate that an object property name follows. This is consistent with the normal convention of identifying properties within an object in a conventional component management system.

Object properties can be more specifically identified by using a parenthetical property identifier. In the example of cell C1, the LastPrice property is more specifically identified by the parenthetical property identifier "B1". The property identifier "B1" refers to cell B1 of the spreadsheet object 400. Thus, the formula of cell C1 invokes the object in cell B1 and determines the LastPrice property for that object. This action effectively returns the LastPrice for the property identifier in B1. In this example, the last stock price for the MSFT stock is retrieved from the object marketdata and stored in cell C1. As described above, in connection with FIG. 3, the notification interface can be used to update the value stored in cell C1, when Cells C2–C5 perform similar functions. Each parenthetical property identifier in cells C2–C5 contain references to corresponding cells in column B. Of course, the stock symbol in column B can be changed to trigger an updated price for the new symbol to be displayed in column C. Similarly, the parenthetical property identifier in column C could be modified to refer to a different cell containing a different stock identifier. The object formulas in cells C1–C5 could also be modified to identify a different object all together than that embedded in cell A1. Thus, the extension of data types supported in spreadsheet object 400 to include external objects provides a powerful means for embedding sophisticated object functionality within a spreadsheet object.

Figure 5:
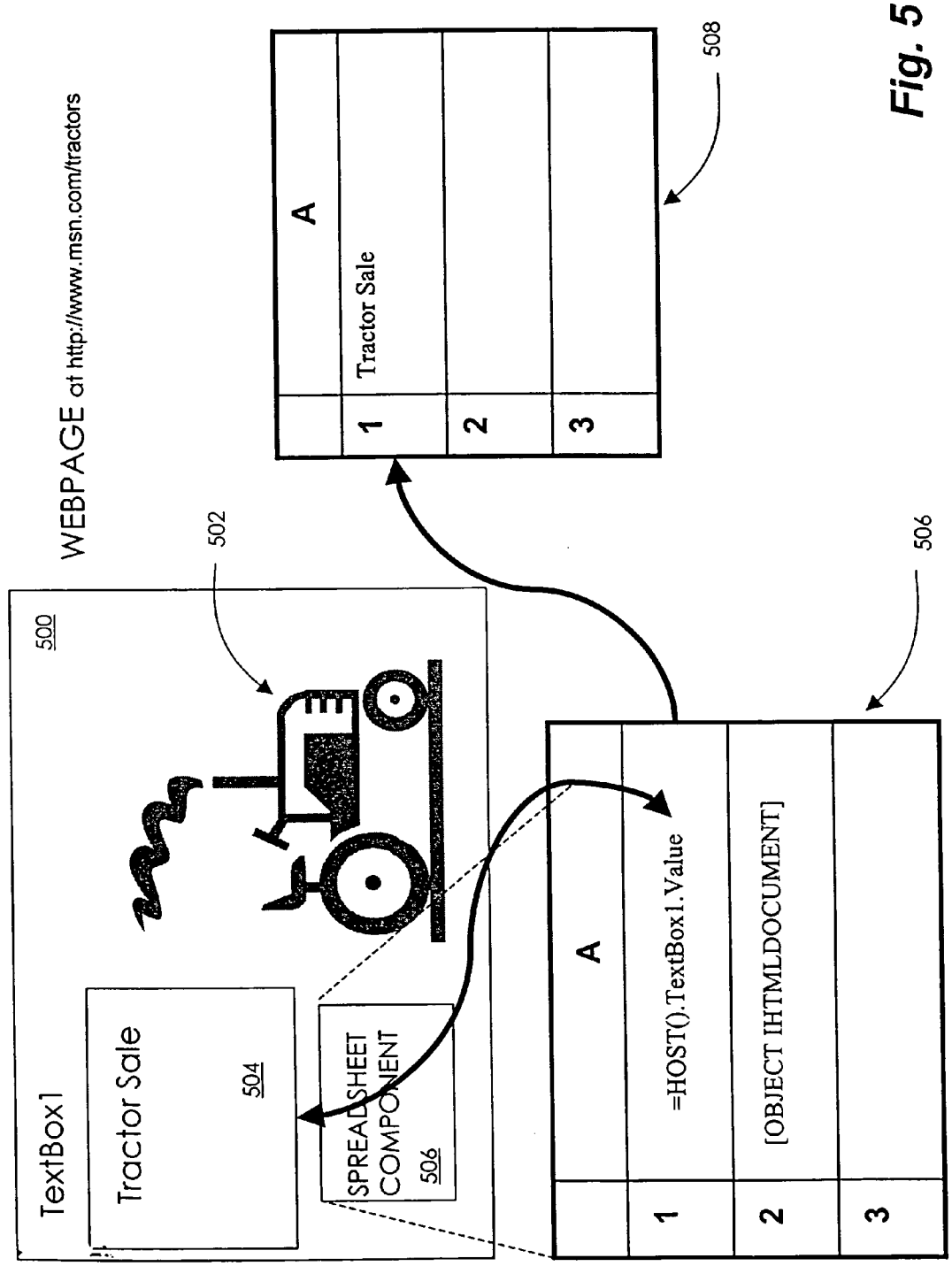
FIG. 5 depicts an exemplary embodiment of the present invention utilized in the context of a web browser

FIG. 5 depicts an exemplary embodiment of the present invention utilized in the context of a web browser, such as Internet Explorer, marketed by Microsoft Corporation of Redmond, Wash. In FIG. 5 a web page 500 is depicted having an image element 502, a spreadsheet component 506 and a text box element 504. The name of the text box is "TextBox1". The spreadsheet object 506 has a column A and rows 1–3. The spreadsheet object 506 is hosted in a web browser (not shown). That is, the spreadsheet object 506, has been embedded in a document (web page 500) that is being displayed by the web browser.

Another object function, the HOST function, has been stored in a formula in cell A1 of spreadsheet object 506. The HOST object operates to return the container object that is hosting the spreadsheet. In the example of FIG. 5, the container object would be the web browser's document object. In the context of a Visual Basic application, the container object would be a Form object.

In a web browser, such as Microsoft's Internet Explorer, the IHTML container object is returned by the HOST function. The IHTML container object provides access to all of the properties of the web page 500 on which the spreadsheet is installed. As described above, in connection with FIG. 4, the "." operator indicates that a property name follows. The "TextBox1" property name returns the textbox property of the hosting web page. Of course, the textbox 504 can have multiple properties. The "value" property name identifies the property of the textbox 504 that will be returned. In this case, the value property of TextBox1 is a string, "tractor sale". Spreadsheet object 508 is simply the graphical representation of spreadsheet object 506 as it would appear to a user after the formula of cell A1 has been evaluated. The value property of TextBox1, "tractor sale" has been returned and is displayed in cell A1 of the spreadsheet object 508. Thus, the host function provides a way for a spreadsheet user to return a container object in which the spreadsheet component is hosted.

Figure 6:
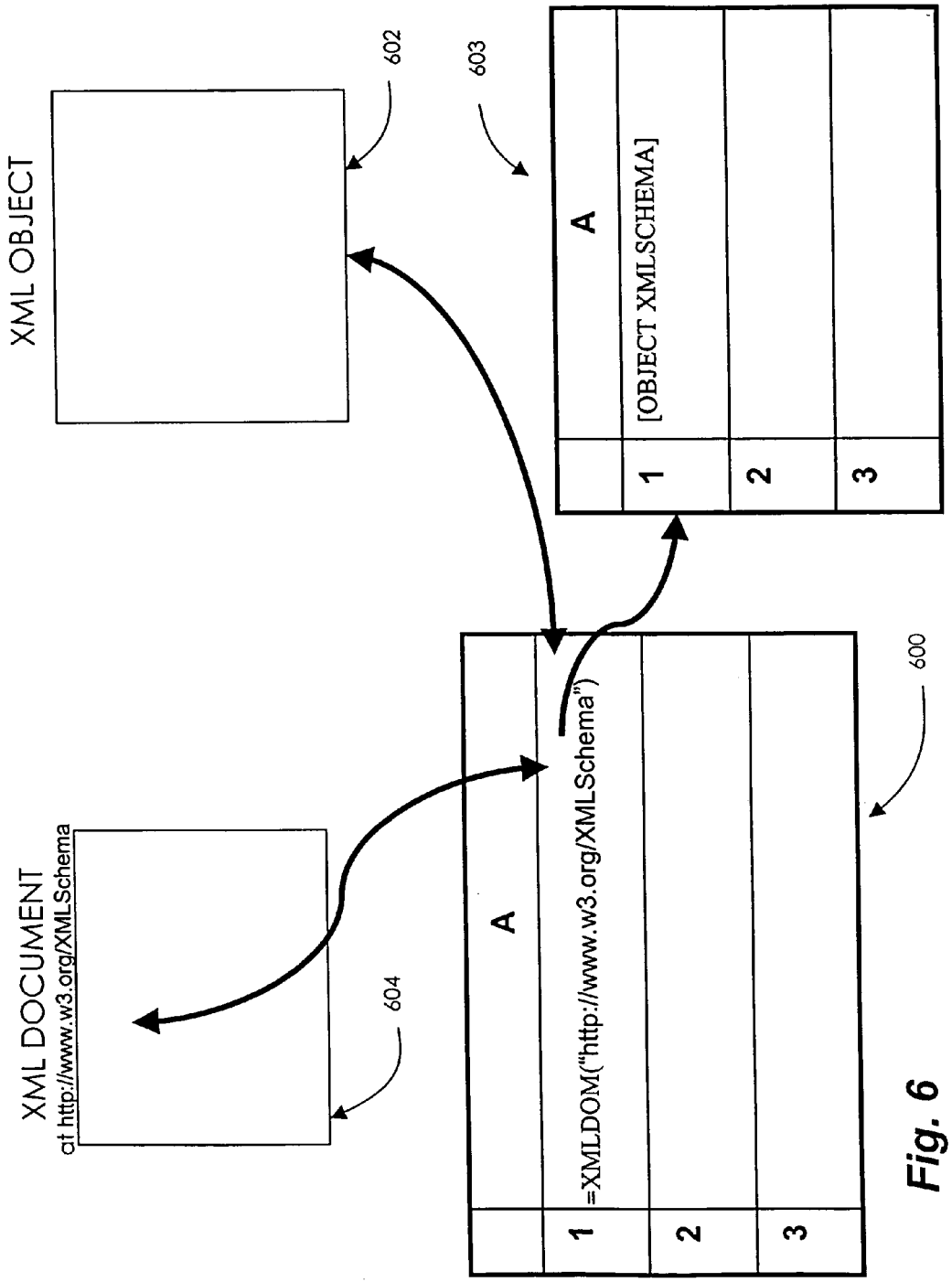
FIG. 6 depicts an exemplary embodiment of the present invention in which an extensible market up language (XML) object is stored in a spreadsheet cell.

FIG. 6 depicts an exemplary embodiment of the present invention in which an extensible market up language (XML) object is stored in a spreadsheet cell. In spreadsheet object 600, cell A1 includes a formula having an XMLDOM function. The XMLDOM function returns an XML object 602. The XML object 602 is actually stored in cell A1. The XMLDOM function identifies an XML document by reference to a document location. In this case, the XML document is a Uniform Resource Locator (URL) that identifies a document on the worldwide web: "http://www.w3.org/XMLSchema". In Microsoft's Component Object Model, the XMLDOM function will return and MSXML object and store the object in the proper spreadsheet cell.

Spreadsheet object 602 is simply the spreadsheet object 600 updated to depict the graphical representation of the XMLDOM object in cell A1. After the formula shown in cell A1 of spreadsheet object 600 has been entered, the graphical representation of that formula will be as shown in cell A1 of spreadsheet object 602. Specifically, the graphical representation can include the word "object" to inform the user that an object is stored in cell A1 and can include the name of the XML object 602 found in the XML document 604.

Figure 7:
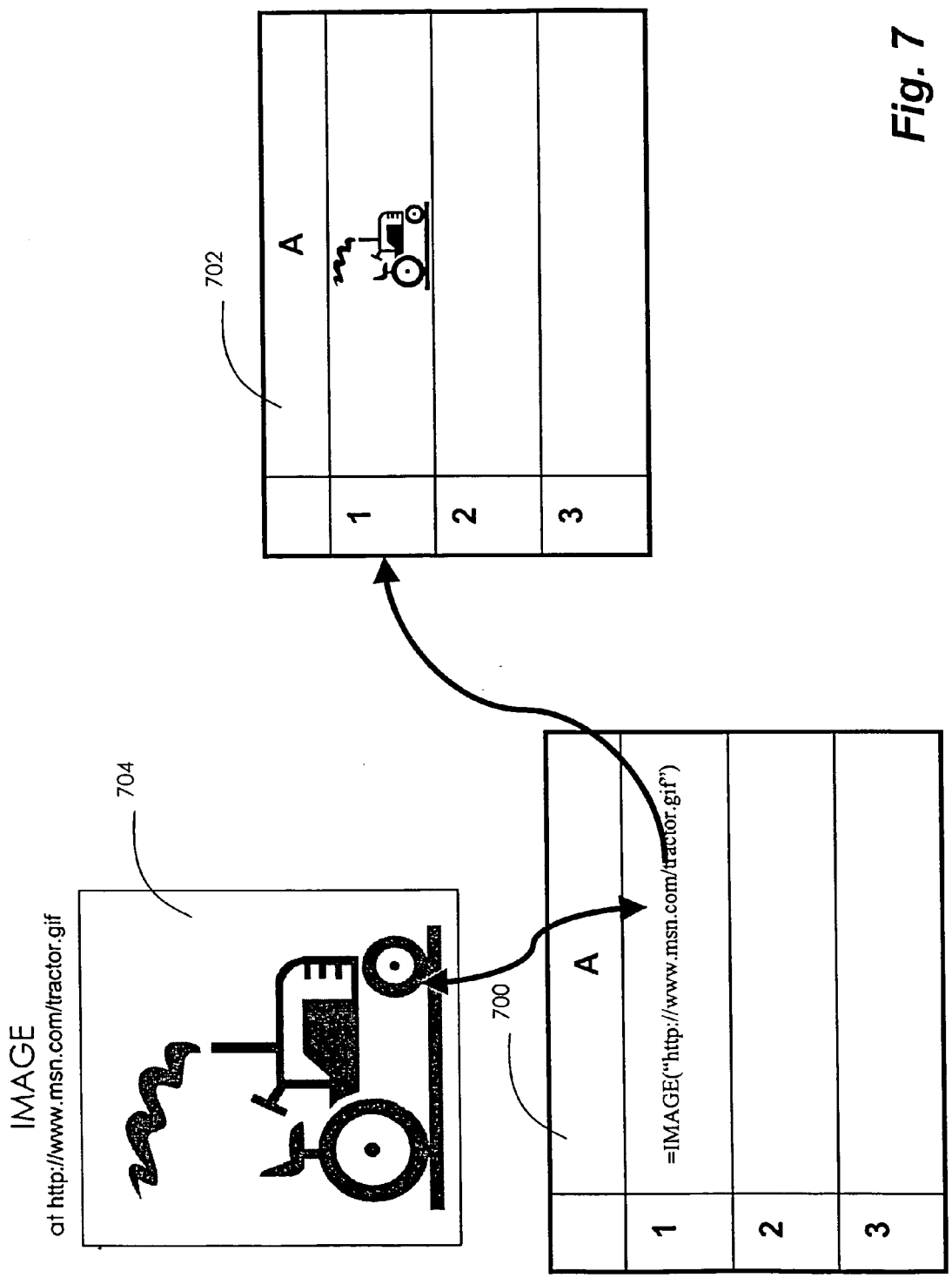
FIG. 7 depicts an alternative embodiment of the present invention in which an image function stores an image object in a spreadsheet cell.

FIG. 7 depicts an alternative embodiment of the present invention in which an image function stores an image object in a spreadsheet cell. In the example of FIG. 7, the image function has been stored in cell A1 of spreadsheet object 700. The image function includes a single argument that identifies an image object by the image object's name and location. In this case, the image's name and location are identified in an URL, "http://www.msn.com/tractor.gif".

Spreadsheet object 702 is a visual representation of the spreadsheet object 700. After the user has input the formula in A1 of spreadsheet object 700, and the image object has been retrieved through the component management system, the image object can be graphically depicted as shown in spreadsheet object 702. As described above, in connection with FIG. 3, an external object can also be graphically represented by reference to an image property of the object.

Figure 8:
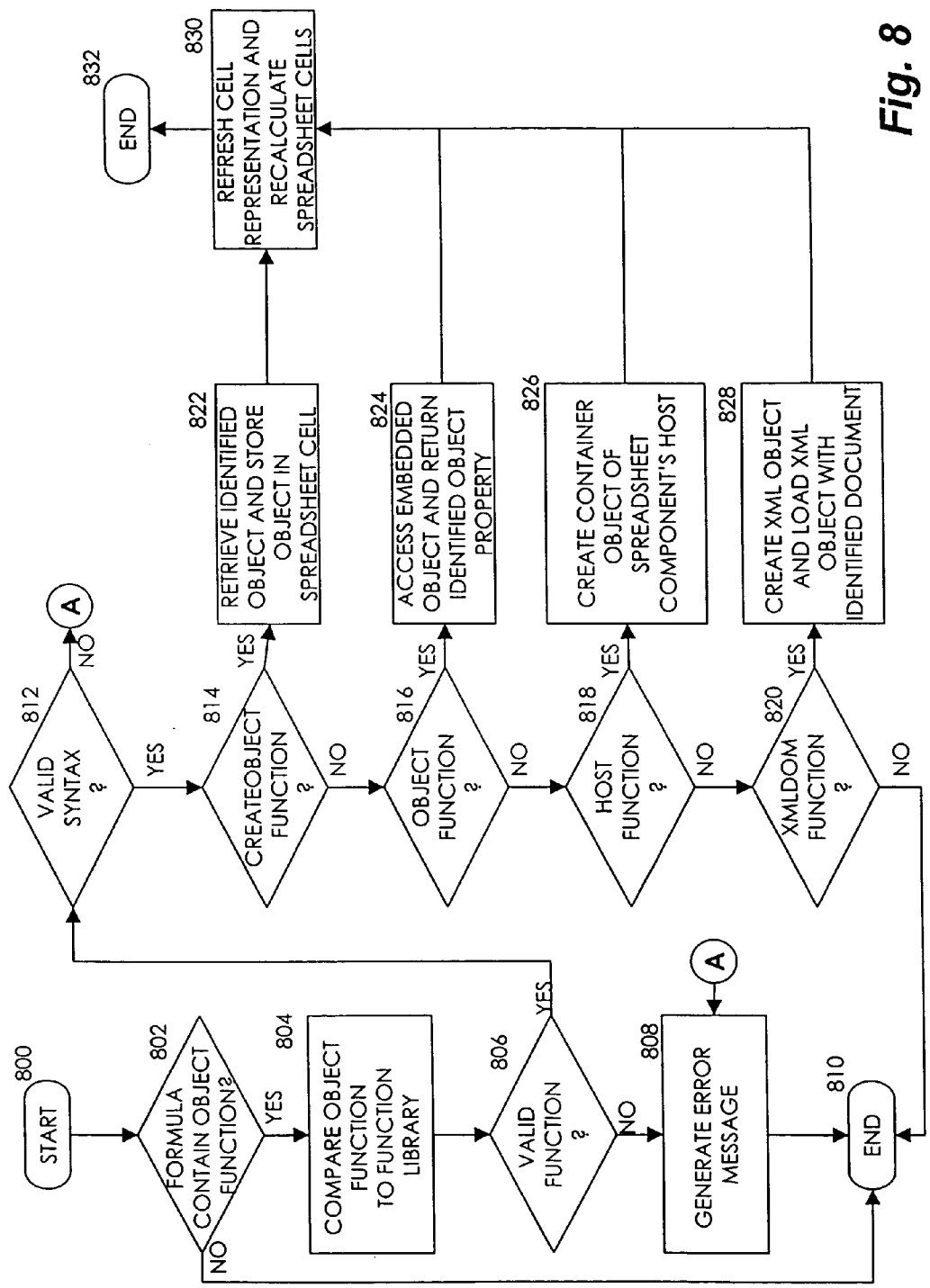
FIG. 8 is a flowchart depicting an exemplary method for parsing a formula and processing an object function contained therein.

FIG. 8 depicts an exemplary method for parsing a formula and processing an object function contained therein. A spreadsheet object may be parsed on a cell-by-cell basis (e.g., at startup) or may be parsed whenever a cell is changed in the spreadsheet object. Those skilled in the art will appreciate that the exemplary method described in FIG. 8 can be used to process object functions, regardless of the parsing technique used.

The method of FIG. 8 begins at step 800 and proceeds to decision block 802. At decision block 802, a determination is made as to whether the formula contains an object function. If the formula does not contain an object function, the method branches to step 810 and ends. If the formula contains an object function, the method branches to step 804 and the object function is compared to a function library.

The method then proceeds to decision block 806 and a determination is made as to whether the function is a valid function. A function is typically valid if it is contained in the function library. If the function is not a valid function, the method branches to step 808 and an error message is generated. The method then proceeds to step 810 and ends. If, at decision block 806, a determination is made that the function is a valid function, the method branches to decision block 812. At decision block 812, a determination is made as to whether the function has a valid syntax. If the function does not have a valid syntax, then the method branches to step 808, via connectors A. At step 808, an error message is generated. The method then proceeds to step 810 and ends.

Returning to decision block 812, if a determination is made that the formula has a valid syntax, then the method branches to decision block 814. At decision block 814, a determination is made as to whether the function is a CREATEOBJECT function. If the method is not a CREATEOBJECT function, then the method branches to decision block 816. At decision block 816, a determination is made as to whether the function is an OBJECT function. If the function is not an OBJECT function, then the method branches to decision block 818. At decision block 818, a determination is made as to whether the function is a HOST function. If the function is not a HOST function, then the method branches to decision block 820. At decision block 820 a determination is made as to whether the function is an XMLDOM function. If the function is not an XMLDOM function, then the method branches to step 810 and ends.

Returning to decision block 814, if a determination is made that the function is a CREATEOBJECT function then the method branches to step 822. At step 822, the object identified by the CREATEOBJECT function is retrieved and stored in the spreadsheet cell containing the CREATEOBJECT function. The method then proceeds to step 830 and the cell is refreshed to visually represent the object, either by object name or graphically, as described above in connection with FIGS. 3 and 7. The method then proceeds to step 832 and ends.

Returning to decision block 816, if the function is an OBJECT function, then the method branches to step 824. At step 824, the embedded object that is identified by the OBJECT function (e.g. by a cell reference), is accessed and an object property identified by the OBJECT function is returned. The object property is stored in the cell containing the OBJECT function. The method then proceeds to step 830 and the cell is refreshed to visually represent the object, either by object name or graphically, as described above in connection with FIGS. 3 and 7. The method then branches to step 832 and ends.

Returning to decision block 818, if a determination is made that the function is a HOST function, then the method branches to step 826. At step 826, a container object of the spreadsheet components HOST is created. The container object is stored in the cell containing the HOST function. The method then proceeds to step 830 and the cell is refreshed to represent the object, either by object name or graphically, as described above in connection with FIGS. 3 and 7. The method then branches to step 832 and ends.

Returning now to decision block 820, if a determination is made that the function is a XMLDOM function, then the method branches to step 828. At step 828, an XML object is created and stored in the cell containing the XMLDOM function. The XML document that is identified in the XMLDOM function is also loaded into the XML object. The method then proceeds to step 830 and the cell is refreshed to represent the object, either by object name or graphically, as described above in connection with FIGS. 3 and 7. The method then branches to step 832 and ends.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method for embedding an object in a spreadsheet cell of a spreadsheet object, the method comprising the steps of:
   receiving an object function as an input into a spreadsheet cell of a spreadsheet object to embed an object in the spreadsheet cell, wherein the object function includes an object identifier identifying a location of the object;
   parsing the object function to determine whether the object function is valid and has a proper syntax;
   accessing the object identified by the object identifier, to determine whether the object is functional;
   embedding the object in the spreadsheet cell, in response to receiving the object function as the input into the spreadsheet cell and a determination that the object function is valid and has the proper syntax wherein the object is created by an application other than that which created the spreadsheet object; and
   recalculating the spreadsheet cell, in response to the determination that the object is functional;
   thereby providing the spreadsheet object with access to outside data services and functionality.

2. A computer readable medium having stored thereon computer-executable instructions for performing the method of claim 1.

3. The method of claim 1, wherein the object function is a CREATEOBJECT function.

4. The method of claim 1, wherein the object function is a HOST function.

5. The method of claim 1, wherein the object function is a XMLDOM function.

6. The method of claim 1, further comprising the steps of:
   receiving as input a reference object function identifying the embedded object and a property of the embedded object;
   storing the reference object function in a second spreadsheet cell; and
   determining the value of a property of the embedded object and storing the value of the property in association with the second spreadsheet cell.

7. The method of claim 1, wherein the step of accessing the object is accomplished by use of a component management system.

8. The method of claim 7, wherein the component management system has a brokering interface and an automation interface.

9. The method of claim 1, further comprising the step of registering the spreadsheet object with a notification interface to receive a notification when the object is modified.

10. The method of claim 9, further comprising the step of recalculating the spreadsheet cell in response to receiving a notification that the object has been modified.

11. A computer system having a graphical user interface including a display and a user interface selection device, the computer system comprising:
    a spreadsheet component receiving an object function as an input into a cell of a spreadsheet object to embed in the spreadsheet cell an object that is external to the spreadsheet object, wherein the object function includes an object identifier identifying a location of the object for invoking the object, the spreadsheet component comprising:
    a formula parser component operative to compare the object function to a function library to determine whether the object function conforms to a predefined syntax contained in a library entry associated with the object function and operative to determine whether the object function properly identifies a data type of the object in order to embed the object in the cell of the spreadsheet object wherein the object is created by an application other than that which created the spreadsheet object therein providing the spreadsheet object with access to outside data services and functionality.

12. The spreadsheet component of claim 11, further comprising a recalculation component operative to invoke the object identified by the object function, in response to a determination that the object function conforms to the predefined syntax and properly identifies the object.

13. The spreadsheet component of claim 12, wherein invoking the object comprises storing the embedded object in the cell of the spreadsheet object.

14. The spreadsheet component of claim 11, wherein the spreadsheet component further comprises a reference object function identifying the embedded object and a property of the embedded object.

15. The spreadsheet component of claim 11, wherein the spreadsheet component is operative to store a value of the property in association with a second cell of the spreadsheet object.

16. The spreadsheet component of claim 12, wherein invoking the object comprises retrieving information from the object and storing the information in the cell of the spreadsheet object.

17. The spreadsheet component of claim 11, wherein the object function is an XMLDOM function.

18. The spreadsheet component of claim 12, wherein invoking the object is accomplished by use of a component management system having a brokering interface and an automation interface.

19. The spreadsheet component of claim 12, wherein invoking the object comprises registering the spreadsheet object with a notification interface to receive a notification when the object is modified.

* * * * *